US012620930B2

(12) United States Patent
Allen et al.

(10) Patent No.: US 12,620,930 B2
(45) Date of Patent: May 5, 2026

(54) MULTI-TIER, FOLDABLE PHOTOVOLTAIC ROOF AND METHOD

(71) Applicant: KING ABDULLAH UNIVERSITY OF SCIENCE AND TECHNOLOGY, Thuwal (SA)

(72) Inventors: Thomas Gerald Allen, Thuwal (SA); Ahmed Hesham Balawi, Thuwal (SA); Michele De Bastiani, Thuwal (SA); Niclas Heescher, Saerbeck (DE); Michael Filipe Salvador, Thuwal (SA); Emmanuel P. Van Kerschaver, Mountain View, CA (US)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 18/870,235

(22) PCT Filed: Jun. 7, 2023

(86) PCT No.: PCT/IB2023/055874
§ 371 (c)(1),
(2) Date: Nov. 27, 2024

(87) PCT Pub. No.: WO2023/238057
PCT Pub. Date: Dec. 14, 2023

(65) Prior Publication Data
US 2025/0330116 A1 Oct. 23, 2025

Related U.S. Application Data

(60) Provisional application No. 63/350,110, filed on Jun. 8, 2022.

(51) Int. Cl.
*H02S 30/20* (2014.01)
*H02S 20/23* (2014.01)

(52) U.S. Cl.
CPC .............. *H02S 30/20* (2014.12); *H02S 20/23* (2014.12)

(58) Field of Classification Search
None
See application file for complete search history.

(56) References Cited

U.S. PATENT DOCUMENTS

2022/0085754 A1* 3/2022 Van Kerschaver ..... H02S 40/36

FOREIGN PATENT DOCUMENTS

| CN | 204948933 U | 1/2016 |
| CN | 107535233 A | 1/2018 |

(Continued)

OTHER PUBLICATIONS

International Search Report in corresponding/related International Application No. PCT/IB2023/055874, date of mailing Aug. 29, 2023.

(Continued)

*Primary Examiner* — Dustin Q Dam
(74) *Attorney, Agent, or Firm* — PATENT PORTFOLIO BUILDERS PLLC

(57) ABSTRACT
A multi-tier, foldable roof includes photovoltaic (PV) cells for transforming solar energy into electrical energy. The roof includes a climate layer configured to close an opening of a structure and also configured to control temperature and humidity of an interior of the structure, a PV screen having plural PV panels, each PV panel configured to include plural PV cells, and an outer layer configured to protect the PV screen from soiling. The climate layer, the PV screen and the outer layer are spaced apart from each other with a given distance (H), and each of the climate layer, the PV screen and the outer layer is configured to change from a retracted state to an expanded state.

18 Claims, 13 Drawing Sheets

(56)          References Cited

FOREIGN PATENT DOCUMENTS

| | | | |
|---|---|---|---|
| CN | 208062877 | U | 11/2018 |
| CN | 109004894 | A | 12/2018 |
| CN | 209073055 | U | 7/2019 |
| CN | 111418407 | A | 7/2020 |
| FR | 3081286 | A1 | 11/2019 |
| GR | 1009915 | B | 1/2021 |
| WO | 2020252651 | A1 | 12/2020 |
| WO | 2022130153 | A1 | 6/2022 |

OTHER PUBLICATIONS

Written Opinion of the International Searching Authority in corresponding/related International Application No. PCT/IB2023/055874, date of mailing Aug. 29, 2023.

* cited by examiner

MULTI-TIER, FOLDABLE PHOTOVOLTAIC ROOF AND METHOD

CROSS-REFERENCE TO RELATED APPLICATIONS

This application is a U.S. National Stage Application of International Application No. PCT/IB2023/055874, filed on Jun. 7, 2023, which claims priority and benefit to U.S. Provisional Patent Application No. 63/350,110, filed on Jun. 8, 2022, entitled "RETRACTABLE PHOTOVOLTAIC ROOF AND METHODS," the disclosures of which are incorporated herein by reference in their entirety.

BACKGROUND

Technical Field

Embodiments of the subject matter disclosed herein generally relate to a photovoltaic roof used for a structure, and more specifically, to a multi-tier, foldable roof that covers the structure and is configured to control two or more of an amount of air flow, light, and heat entering the structure, and also to simultaneously generate electrical energy so that the structure approaches energy self-sufficiency.

Discussion of the Background

The United Nations declared Clean Energy, Food and Water security as part of the 17 most pressing challenges for our global society. This is particularly critical in hot and arid climates like in the Arabian Peninsula, where roughly 80% percent of food is imported, water scarcity is an enduring problem and fossil fuels dominate the energy supply.

The hot climate combined with the scarcity of groundwater makes open-land farming economically and environmentally impracticable in many regions of the world. Thus, these regions rely today on greenhouses for controlling the climate and water provided to the plants. Modern greenhouses with controlled environments and smart water irrigation systems enable year-round growing of produce at reduced levels of water consumption. While greenhouses could deliver the desired increase in food security, this comes at the cost of additional energy needs, which requires a solution.

To sustain optimal crop growth in greenhouses located in areas with intense solar irradiation, the amount of sunlight has to be reduced by as much as 50-70% during peak solar irradiation hours. This is typically accomplished using passive shading systems as illustrated in FIG. 1. The shading system 100 of FIG. 1 has plural flexible fabric folds 110, each end of the fold 110 being provided with a solid rod 112A, 112B. The rods 112A, 112B are configured to be placed into corresponding brackets 114, and these brackets are suspended from a hanging wire (not shown) with corresponding clips 116.

FIG. 1 also shows fixed structures 118, belonging to the building that is using the system 100, and end of system brackets 120. The flexibly fabric folds 110 are made of a fabric, that may be partially transparent to the solar light. The system 100 is shown in FIG. 1 being in a retracted state. When the system 100 needs to be expanded, to cover the corresponding building, a motor (not shown) actuates an end of the system bracket 120 and spreads the brackets 114 along the hanging wires to unfold the folds 110. This single layer roof system is capable to control the amount of light and air flow entering the building protected by this roof. Alternatively, plastic wires are pulled between the two ends of the room structure. The very lightweight screen is sitting on the plastic wire bed and pulled/pushed by a front bar that is powered by a motor.

However, controlling only the light and air flow entering the building is not enough for many greenhouses in the arid areas. In addition to shading, greenhouses employ expensive active cooling. Notably, the energy consumption for greenhouse cooling in hot climates (desert regions) is about 80-100 kWh/m$^2$/yr for evaporative-cooled greenhouses (water consumption: for cooling about 80 L/kg of tomatoes, for irrigation about 50 L/kg of tomatoes) and 500-600 kWh/m$^2$/yr using mechanical cooling (water consumption: for cooling OL/kg of tomatoes, for irrigation about 10 L/kg of tomatoes). This added operation cost limits the financial viability of greenhouses and thus adversely impacts overall crop yield potential in these areas. Adding to this negative scenario, recent and predicted increases in the cost of electricity will further disincentivize the large-scale development of greenhouse farming and perpetuate the arid areas' dependence upon imported foods.

The shade system 100 illustrated in FIG. 1 might be a good fit for countries in central Europe, which have abundant levels of fresh water, e.g., the Netherlands, and climatic conditions diametrically opposed to the Middle East, in which greenhouses are mostly used to maintain heat and maximize the penetration of sunlight for a certain latitude and climate (increased sunlight in the winter). Practical experience over the past years in the arid regions of the Earth, as the Arabian Peninsula, has shown that (1) mainstream glass greenhouses with a static glass roof and with highly controlled environment and (2) greenhouses with a foldable roof (as in FIG. 1), produce high crop yields even in the desert, but have either a large water footprint when combined with evaporative cooling, or impose high levels of energy consumption when combined with mechanical cooling. These approaches are only economically viable because of highly subsidized electricity prices and only for high-value specialty crops. From an environmental perspective and considering the carbon footprint of such a solution, these approaches are not sustainable in the long term.

Thus, there is a need for a new approach to the greenhouses design so that not only the amount of light and air flow entering the structure are controlled, but the amount of energy necessary to run such buildings is reduced and possibly eliminated.

SUMMARY

According to an embodiment, there is a multi-tier, foldable roof including photovoltaic (PV) cells for transforming solar energy into electrical energy. The roof includes a climate layer configured to close an opening of a structure and also configured to control temperature and humidity of an interior of the structure, a PV screen having plural PV panels, each PV panel configured to include plural PV cells, and an outer layer configured to protect the PV screen from soiling. The climate layer, the PV screen and the outer layer are spaced apart from each other with a given distance (H), and each of the climate layer, the PV screen and the outer layer is configured to change from a retracted state to an expanded state.

According to another embodiment, there is a photovoltaic, PV, layer to be used to cover a greenhouse, and the PV screen includes a first PV panel including plural PV cells configured to transform solar energy into electrical energy, a second PV panel including plural PV cells configured to transform solar energy into electrical energy, a connecting mechanism configured to suspend each of the first and second PV panels from a hanging wire, the connecting mechanism including first and second fabric layers, and an electrical connection mechanism configured to electrically connect the first PV panel to the second PV panel. The electrical connection mechanism includes an electrical cable that extends through each of the first and second fabric layers.

According to yet another embodiment, there is a structure with a multi-tier foldable roof, and the structure includes plural walls that define an enclosure, and the multi-tier foldable roof that covers the enclosure. The multi-tier foldable roof includes a climate layer configured to close the enclosure and also configured to control temperature and humidity of the enclosure, a PV screen having plural PV panels, each PV panel configured to include plural PV cells, and an outer layer configured to protect the PV screen from soiling. The climate layer, the PV screen and the outer layer are spaced apart from each other with a given distance (H), and each of the climate layer, the PV screen and the outer layer is configured to change from a retracted state to an expanded state.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a triple-tier foldable roof that incorporates photovoltaic (PV) panels for supplying electrical current, in addition to regulating the amount of light, heat and air flow. However, the embodiments discussed herein are not limited to a triple-tier roof, but may be applied to any number of layers that make up the roof.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, there is a greenhouse (or any other building that requires a roof) that has a multi-tier, foldable roof, and at least one layer of the multi-tier includes PV panels. The multi-tier, foldable roof includes three different layers, each layer having a different functionality. The three layers are independently controlled so that any combination of two layers or a single layer may be opened or closed, as desired. A middle layer of the three layers includes the PV panels. The middle layer, i.e., the PV screen, is protected by the top layer when needed, and the bottom layer helps control the environment inside the structure, as discussed in more detail below.

Figure 2A:
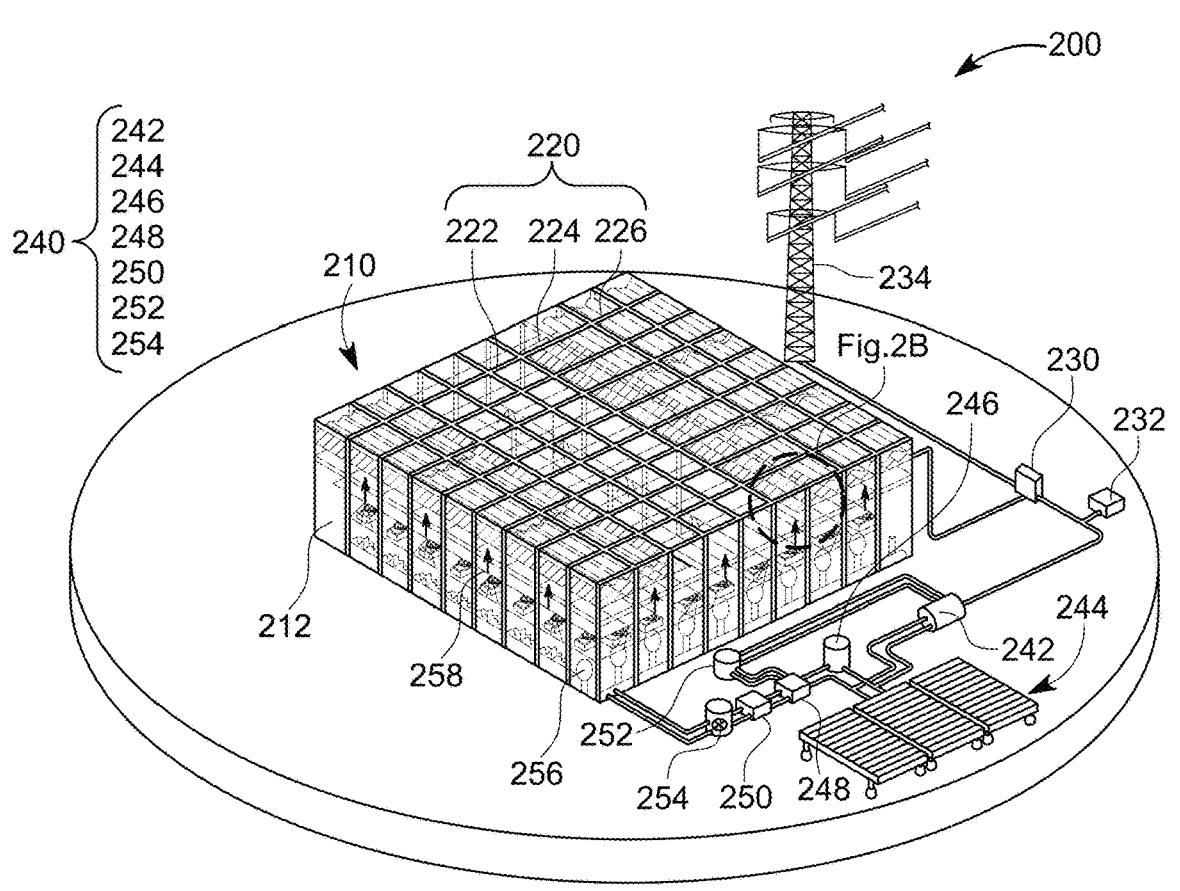
FIGS. 2A and 2B illustrate a structure having a multi-tier, foldable roof, that includes a photovoltaic (PV) shade screen, i.e., a multifunctional PV panel that provides ideal shading and electricity generation from the blocked sunlight.

FIG. 2A shows a system 200 that includes a structure 210, for example, a greenhouse, but any other building may be considered, that has plural walls 212, and a top opening defined by the walls 212 is covered by a multi-tier, foldable roof 220. The foldable roof is more effective at controlling the temperature inside the structure throughout the year in hot climates, then a static roof, which leads to better energy efficiency. The roof 220 includes, in this embodiment, a climate layer (screen) 222, a PV screen 224, and an outer layer 226, disposed in this order, i.e., the PV screen 224 is sandwiched between the climate layer 222 and the outer layer 226, as shown in more detail in FIG. 2B. The climate layer 222 may be made of a transparent material that may be impermeable to air and/or water. The climate layer 222 is configured to close (hermetically if desired) the opening formed by the walls 212 and to prevent air, heat, and water from entering inside the greenhouse 210 or exiting the greenhouse. As illustrated and discussed later, the climate layer 222 can be retracted to unseal the interior of the greenhouse 210.

The PV screen 224 is also foldable and includes plural PV panels, which are connected to each other (mechanically and electrically) and are configured to generate electricity when the PV screen is expanded (i.e., the PV panels are substantially extending in a same plane; note that the PV screen generates electricity even when partially expanded, but not as efficient as when fully expanded). The PV panel has regions not occupied by PV cells, which ensure that light can pass through the panel even when the PV screen is expanded. In this regard, the PV cells are likely thick enough to not allow light to pass by. A system for folding the PV screen and associated method is discussed later. A structure of the PV screen is also discussed later.

The outer layer 226 is also foldable, and is configured to protect the PV screen from the ambient. In one application, the outer layer 226 is UV-stabilized, high-transparency and configured to allow the solar light to enter the inside of the greenhouse, but not impurities like dust or sand.

Figure 2B:
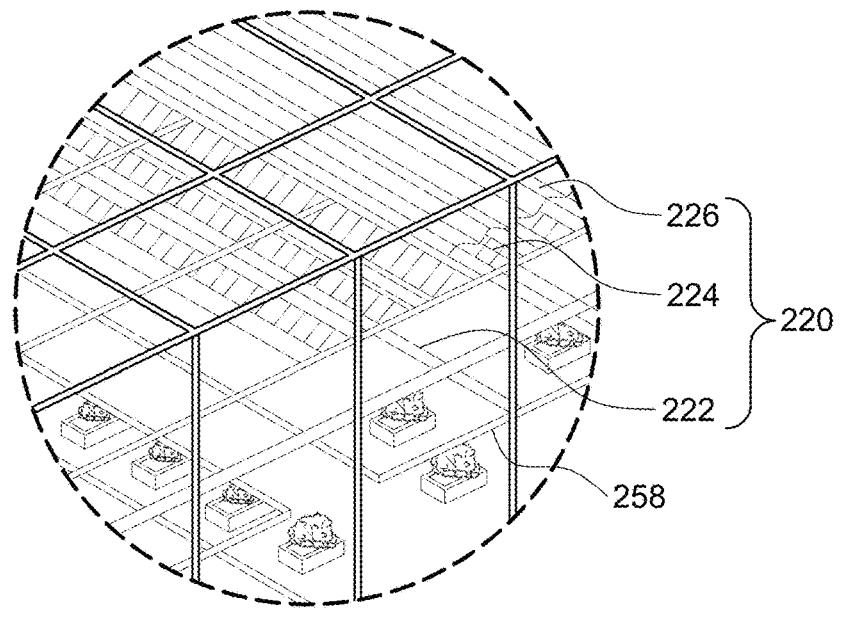

The system 200 may further include an electrical panel 230, that may be connected to the electrical network 234, for supplementing the electrical energy locally generated by the PV panels. The electrical panel 230 is electrically connected to a battery storage unit 232, for storing the energy provided by the PV panel, when not fully used. The electrical panel 230 is also electrically connected to the PV screen for receiving the energy generated by the PV panels. The system 200 may further include an evaporative-cooled system 240 for producing localized temperature controlled air to the plants inside the greenhouse. In one embodiment, the evaporative-cooled system 240 includes a compressor chiller 242, solar collectors 244, a hot battery 246, a vapor absorption chiller 248, a heat pump 250, a cooling tower 252, and a cold battery 254. Other configurations may be used for the evaporative-cooled system 240. In this embodiment, the evaporative-cooled system 240 is placed outside the greenhouse 210. A water to air heat exchanger 256 may be provided inside the greenhouse 210, for providing temperature-controlled air streams directly to the plants inside. Piping 258 is shown in FIGS. 2A and 2B for distributing such cooled air to the plants. Note that the PV screen system is designed to power the greenhouse, but there might be scenarios where the energy provided by the PV screen may not be sufficient to power the cooling and all other appliances. Then the system with the solar collectors and heat exchanger may be used as a complementary power source. This means that in one application, there is no need for the system with the solar collectors and heat exchanger.

In one embodiment, the PV screen 224 is sized to have enough PV panels to entirely power the utilities of the greenhouse, i.e., irrigation, climate control, peripheral cooling, and growth systems. In one application, by recycling the otherwise blocked and "wasted" sunlight inside a greenhouse, it is possible to transform greenhouses from net electricity consumers to small power stations with zero net energy consumption. The nominal power of the photovoltaic roof is about 100 W/m² and will result in a 1 MW installation for a 1-ha model greenhouse, which is enough for covering the entire energy needs of the greenhouse. This approach creates synergistic opportunities for dual use of land, i.e., crops and electricity being harvested on the same land, which leads to enhanced land use efficiency (also known as Agrivoltaics). As opposed to ground-mounted PV, the retractable/foldable PV screen 224 can be protected by the outer layer 226 against soiling events such as sandstorms, offering a means to maintain the nominal power conversion efficiency. Conversely, photovoltaic greenhouses with conventional modules mounted onto the roof require a heavy steel structure due to the extra weight while the PV system discussed herein consists of lightweight but stiff plastic laminates without glass and aluminum frame. An additional disadvantage of conventional solar panels is that the modules are static. The shading cannot be changed throughout the seasons, which offers suboptimal lighting conditions for the plants.

Figure 3:
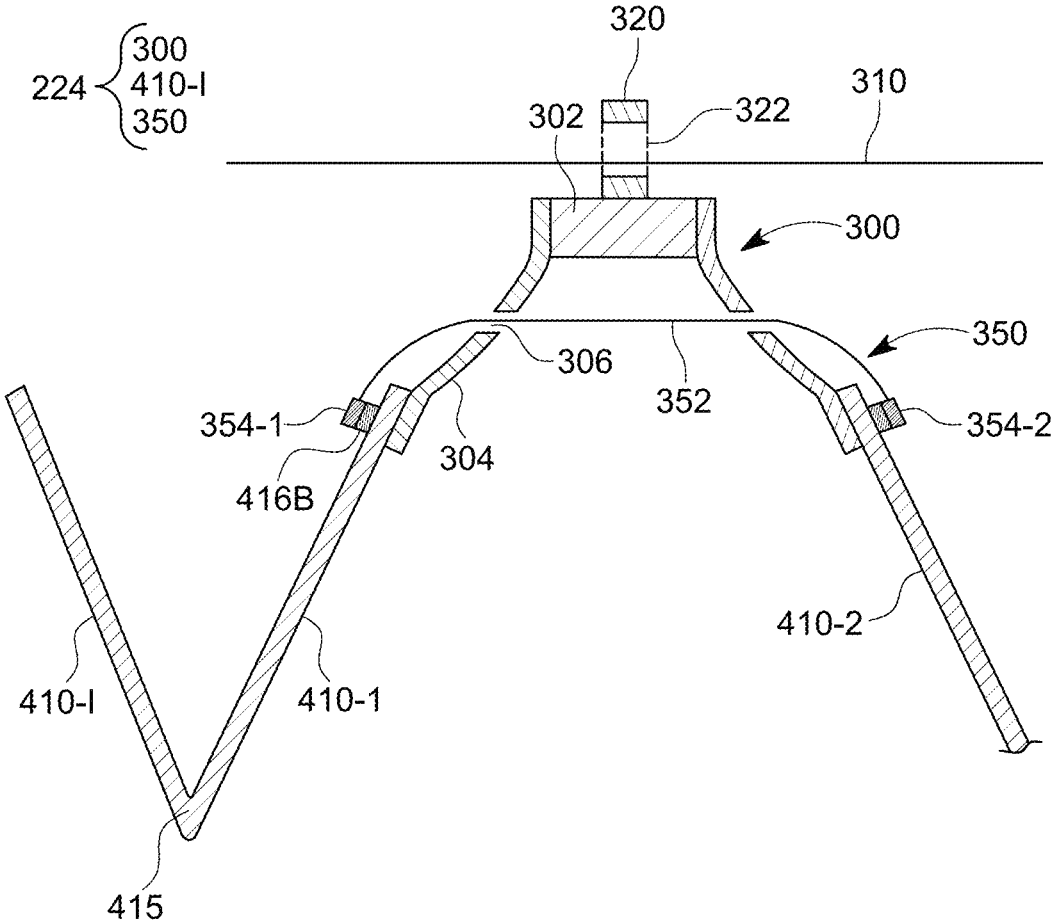
FIG. 3 illustrates a connection mechanism for hanging the foldable roof from plural hanging wires and an electrical connection mechanism for electrically connecting PV panels of the PV screen.

A mechanism for attaching the PV screen 224 to the greenhouse 210 and also for folding the PV panels of the PV screen, is now discussed with regard to FIG. 3. This figure shows the PV screen 224 including plural PV panels 410-1, where I is an integer equal to or larger than 2, a connecting mechanism 300, which not only connects two adjacent PV panels 410-1 and 410-2 to each other, but also attach the ends of these PV panels to a hanging wire 310, and an electrically connection mechanism 350, which is configured to electrically connect one PV panel to another. Note that FIG. 3 shows only three PV panels for simplicity, but an actual PV screen 224 is likely to include tens or even hundreds of PV panels.

Figure 4:
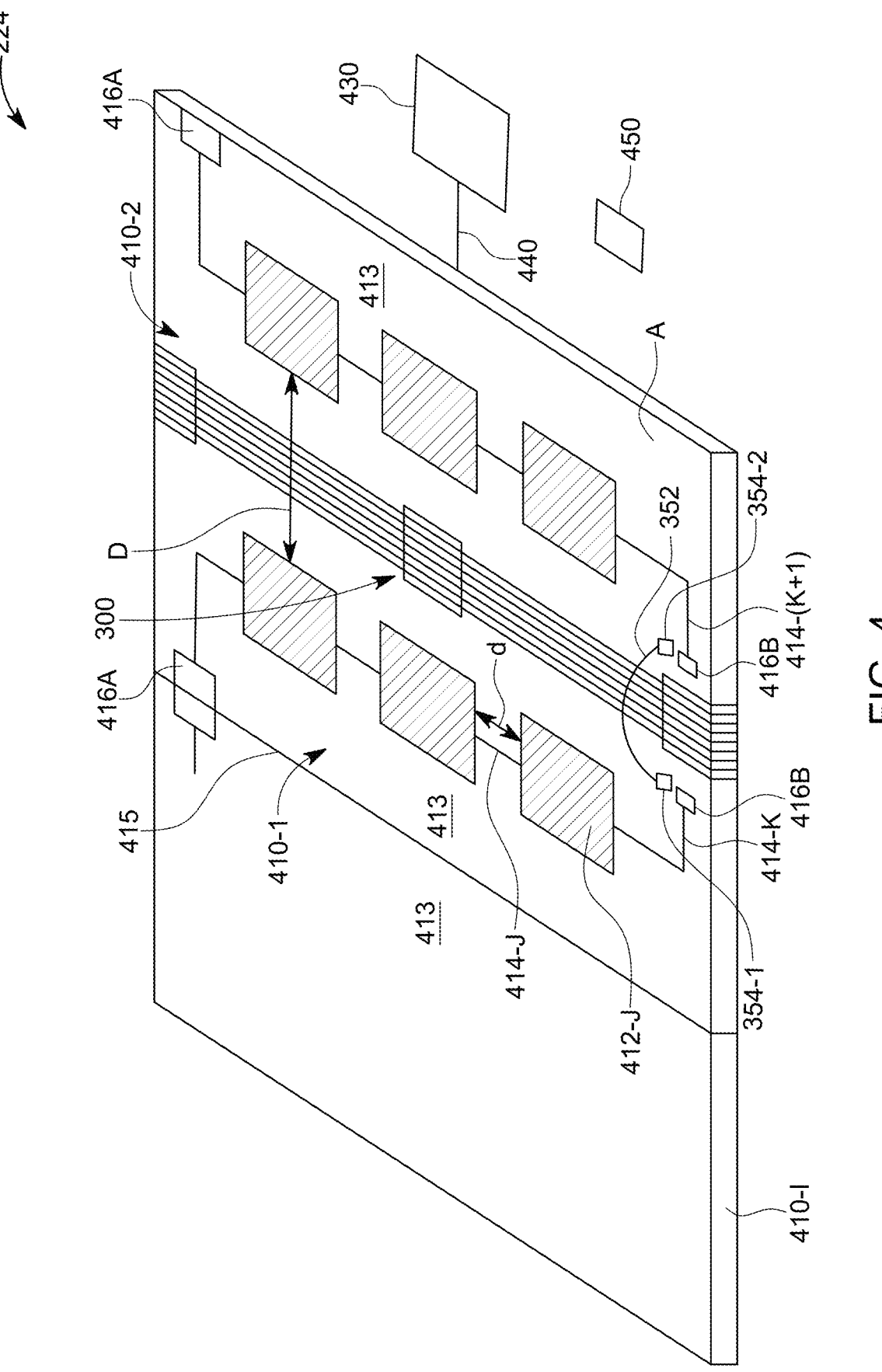
FIG. 4 illustrates the plural PV panels that form the PV screen, which is one of the layers of the multi-tier, foldable roof.

Two PV panels 410-1 and 410-2 and their corresponding connecting mechanism 300 are shown in more detail in FIG. 4. The PV screen 224 further includes an actuation mechanism 430 (which can be an electrical motor connected to a single PV panel of the PV screen). The actuation mechanism 430 provides the necessary force to the PV panels for folding or unfolding the plural PV folds 410-1. In addition, the PV screen 224 may be associated with a controller 450 for controlling the folding and unfolding of the PV panels. Note that the PV panels are illustrated in FIG. 4 as being shaped as rectangles, but other shapes may be used for them.

Each PV panel 410-I includes plural PV cells 412-J (where J is an integer equal to or larger than one), and the PV cells are electrically connected to each other to form a string. Thus, a panel includes a string of cells that are encapsulated by a transparent material 413. For example, the PV cells in the embodiment of FIG. 4 are connected in series to each other. However, it is possible to connect the PV cells in parallel or in a combination of series and parallel. The electrical circuit formed by the PV cells 412-J of a given panel 410-1, and their corresponding interconnecting links 414-J have two end pads 416A and 416B. The first pad 416A, which is optional, is electrically connected, in a direct manner, to a corresponding pad of an adjacent PV panel 410-I while the second pad 416B is electrically connected, through the electrical connection mechanism 350 to a corresponding pad of the PV panel 410-2. Note that in one application, only the second pad 416B is present. Also note that the PV cells and corresponding interconnections of the PV panel 410-I are omitted in the figure for simplicity. In one application, the pads 416 are omitted and the corresponding interconnections 414J are directly connected between the two adjacent pads 410-1 and 410-1. This direct connection is the case for the ends of adjacent PV panels that are directly connected to each other, at interface 415, with no connecting mechanism 300, as is the case for PV panels 410-1 and 410-1. In other words, there are two types of electrical and mechanical connections between two adjacent PV panels. If the two adjacent PV panels 410-1 and 410-2 are connected to each other, mechanically and electrically, through the connecting mechanism 300 and electrical connection mechanism 350, then the connecting ends of the two PV panels do not come in direct contact with each other, but the two mechanisms 300 and 350 achieve the mechanical and electrical contacts as illustrated in FIG. 3. However, if the two adjacent PV panels 410-1 and 410-I are directly connected to each other, as shown in FIG. 4, then the connecting ends of these two PV panels physically contact each other and an electrical connection extends from one of the two PV panels to the other one without any intermediary connecting mechanism. Thus, each fold of the PV screen 224 is either as shown in FIG. 3 (with elements 300 and 350), or as shown in FIG. 4 (with interface 415). In one application, these two folds are interspersed so that each fold type is followed by a different fold type.

As shown in FIG. 3, PV panels 410-I and 410-1 fold along a common interface 415, formed of the material 413 that encapsulates the PV cells (not shown), while PV panels 410-1 and 410-2 are connected to each other, mechanically, by the connecting mechanism 300, and electrically, by an electrical connection mechanism 350. The same arrangement may repeat for other PV panels in the PV screen 224. The electrical connection mechanism 350 includes an electrical cable 352 configured with end electrical connectors 354-1 and 354-2, which are configured to mate with corresponding electrical pads 416B of the PV panels. The electrical connectors 354-1 and 345-2 may be configured with pins to electrically engage the pads 416B. The electrical connectors 345-1 and 345-2 are removably attached to the pads 416B. The electrical cable 352 is configured to pass through corresponding holes 306 made in the material layer 304, which mechanically connects the PV panels to a bracket 302. The bracket 302, which can be made of plastic, composite, or metal, is a central point for hanging the PV panels to the hanging wire 310. Plural hanging wires may be used for the PV panels. In this embodiment, clips 320 (only one shown for simplicity), which are attached to the bracket 302, and have corresponding hole 322, are configured to receive the hanging wire 310 through the hole 322. Thus, each clip 320 is configured to slide along the hanging wire 310.

Figure 5:
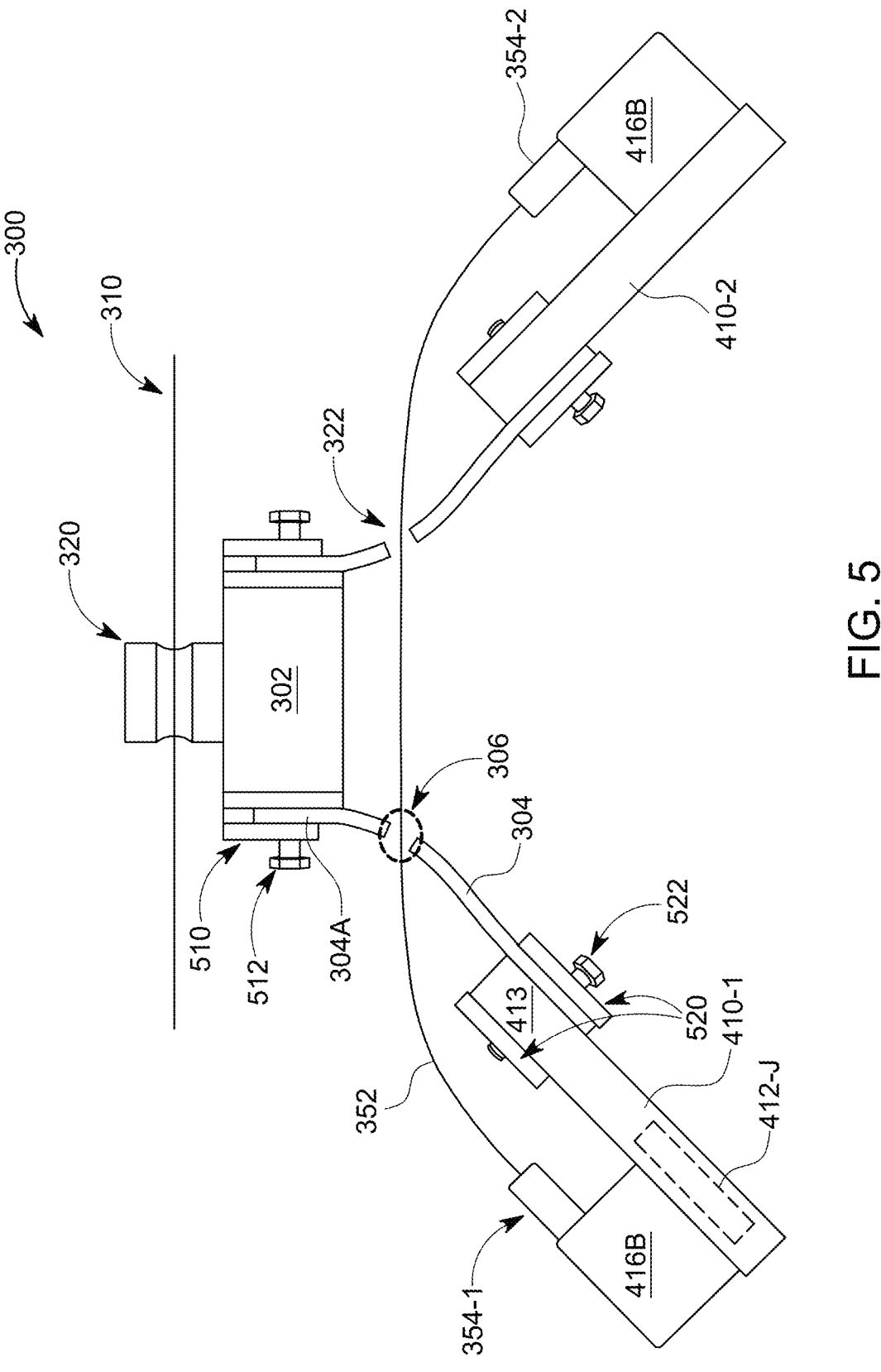
FIG. 5 illustrates one implementation of the connection mechanism and electrical connection mechanism shown in FIG. 3.
Figure 6:
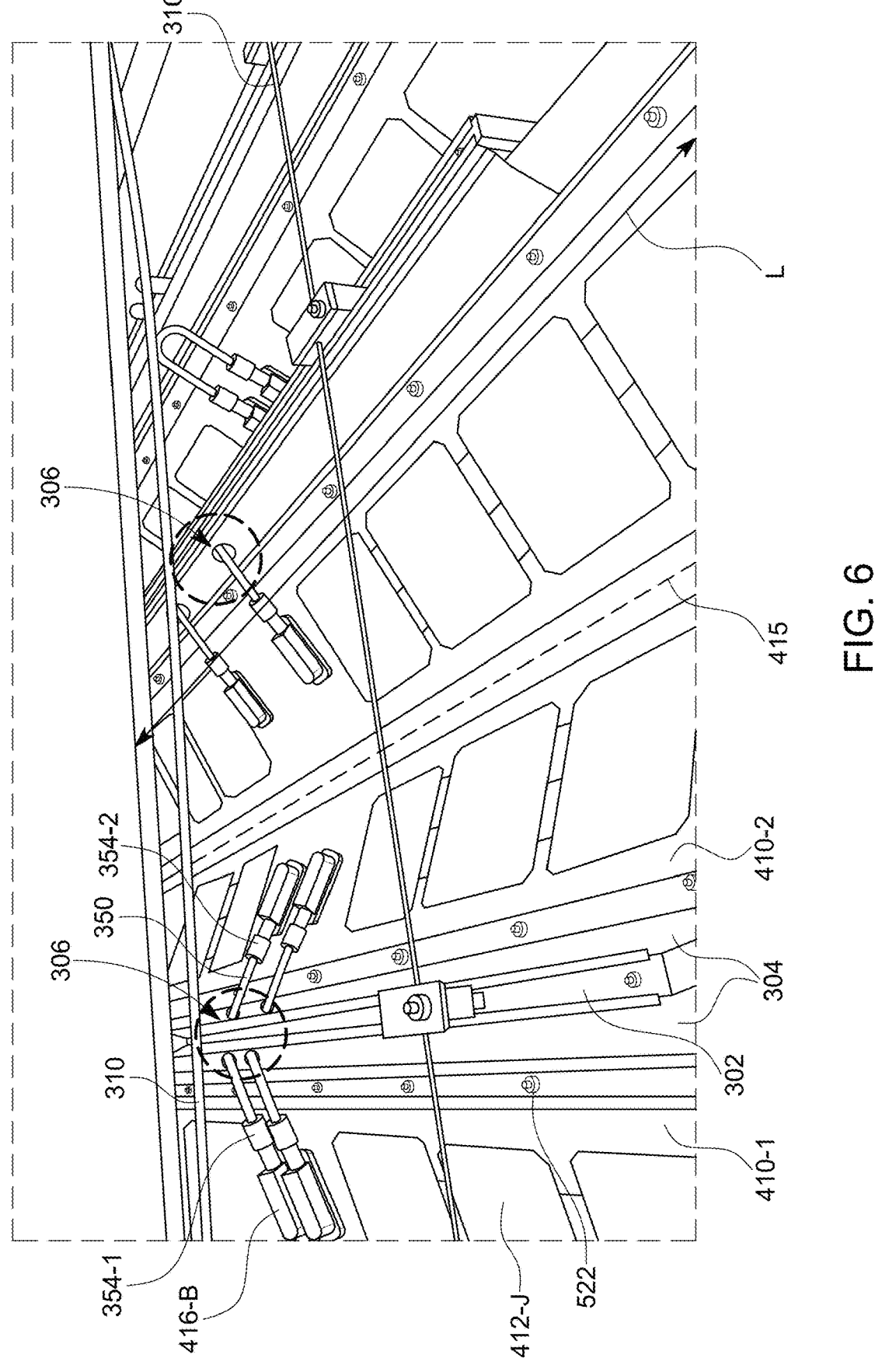
FIG. 6 illustrates the PV screen in an expanded state, as it is hanging from plural hanging wires.

FIG. 3 shows the connecting mechanism 300 including the bracket 302, and two fabric layers 304, each layer attached to both the bracket and to a corresponding PV panel by any means, i.e., screws, glue, profiles, etc. A more specific implementation of the connecting mechanism 300 is shown in FIGS. 5 and 6. Note that the implementation of FIG. 5 is not intended to limit the applicability of the invention, just to exemplify to the one skilled in the art how to make the invention. Bracket 302 is made of Al in this embodiment and it is attached, glued or with a screw (not shown) to the clip 320, which is made of a polymer material. A first end 304A of the fabric layer 304 is attached with a clamp 510 (for example, made of steel) and a screw 512 to the bracket 302. A second end 304B of the fabric layer 304 may also be attached with clamps 520 and a screw 522 to the encapsulant material 413 of each PV panel. The fabric layer 304 may be made from any fabric, for example, nylon, which is strong enough to hold the PV panels. In one application, the fabric layer 304 is made of a material that allows the air to pass through.

Each PV panel may have a junction box, which is the pad 416B discussed with regard to FIG. 4, and the junction box is configured to electrically connect to one of the electrical connectors 354-1 and 354-2, as illustrated in FIGS. 5 and 6. FIG. 6 shows the bracket 302 extending along an entire length L of the PV panels 410-1 and 410-2, and also shows the fabric layers 304 also extending along the entire length L. However, in one application, it is possible that the length of the bracket 302 and the length of the fabric layers 304 is smaller than the length L of the corresponding PV panels.

A PV cell 412-J may have any known structure. For example, the solar cell 412-J may be based on crystalline, multi crystalline or amorphous silicon technology, but the exact cell technology may be different, for example, it may be copper indium gallium selenide (CIGS) cells, cadmium telluride (CdTe) cells, conventional top-cells or bifacial or any other emerging cell technology. The string of PV cells for each string in a given PV panel can consist of variable numbers of solar cells. Various possible configurations of the PV cells and the PV panels are discussed in U.S. patent application Ser. No. 17/421,152, which is assigned to the assignee of this application, and the entire content of this patent application is incorporated herein by reference. Materials that may be used for the encapsulation material 413 are ethylene-vinyl acetate (EVA), polyvinyl butyral (PVB), thermoplastic polyurethane (TPU) or similar materials. Other materials for the encapsulant such as plastics made of ethylene tetrafluoroethylene (ETFE), polyvinyl fluoride (PVF), may also be used. The use of plastics rather than glass throughout the PV screen 224 allows to keep the PV roof at a low weight.

The PV cells are connected together into strings using interconnection methods as used for conventional panels, like soldering or gluing ribbons and bus wires or directly interconnecting the cells using printable conductive inks. The shapes, sizes and the spacing of the cells (distance d in FIG. 4 between cells on the same string and distance D between cells from different panels) can be customized to control the transparency of the PV system. The term "transparency" in this application is used to describe the surface area of a PV panel that is transparent to sun light or any other type of artificial illumination. This means, that for the embodiment shown in FIG. 4, for the PV panel 410-2, region A (the area of the panel that is not occupied by PV cells 412-J) is transparent while the regions occupied by the PV cells 412-J, the end pad 416B, and the regions occupied by the interconnecting links 414-J are not transparent to light (unless the cells are so thin that they become transparent or other semitransparent solar cell technologies are used). In fact, the regions occupied by the PV cells, the interconnecting links, and the end pad are responsible for generating a shade behind the PV panel. By controlling the distances d, D and also the amount of folding of the PV panels 410-i, the controller 450 in effect controls the transparency area and the shade area associated with the PV screen 224. Thus, in this way, it is possible to control the amount of light that enters into the greenhouse (or any other enclosure) to which the PV system is attached to (or simply to control the amount of light on the side of the PV system opposed to the incoming light).

Figure 7:
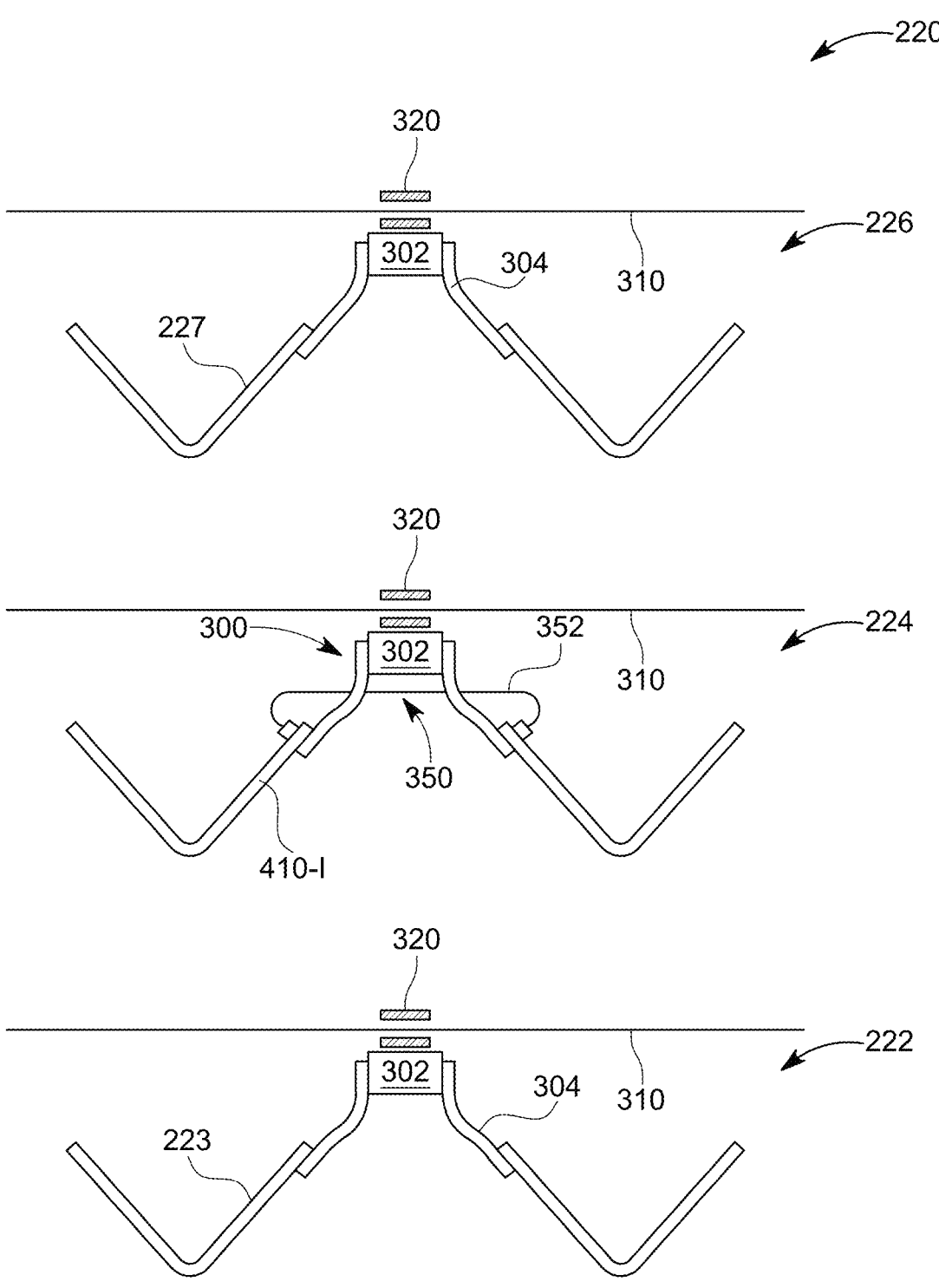
FIG. 7 is a side view of the multi-tier, foldable roof, having three different layers.
Figure 8:
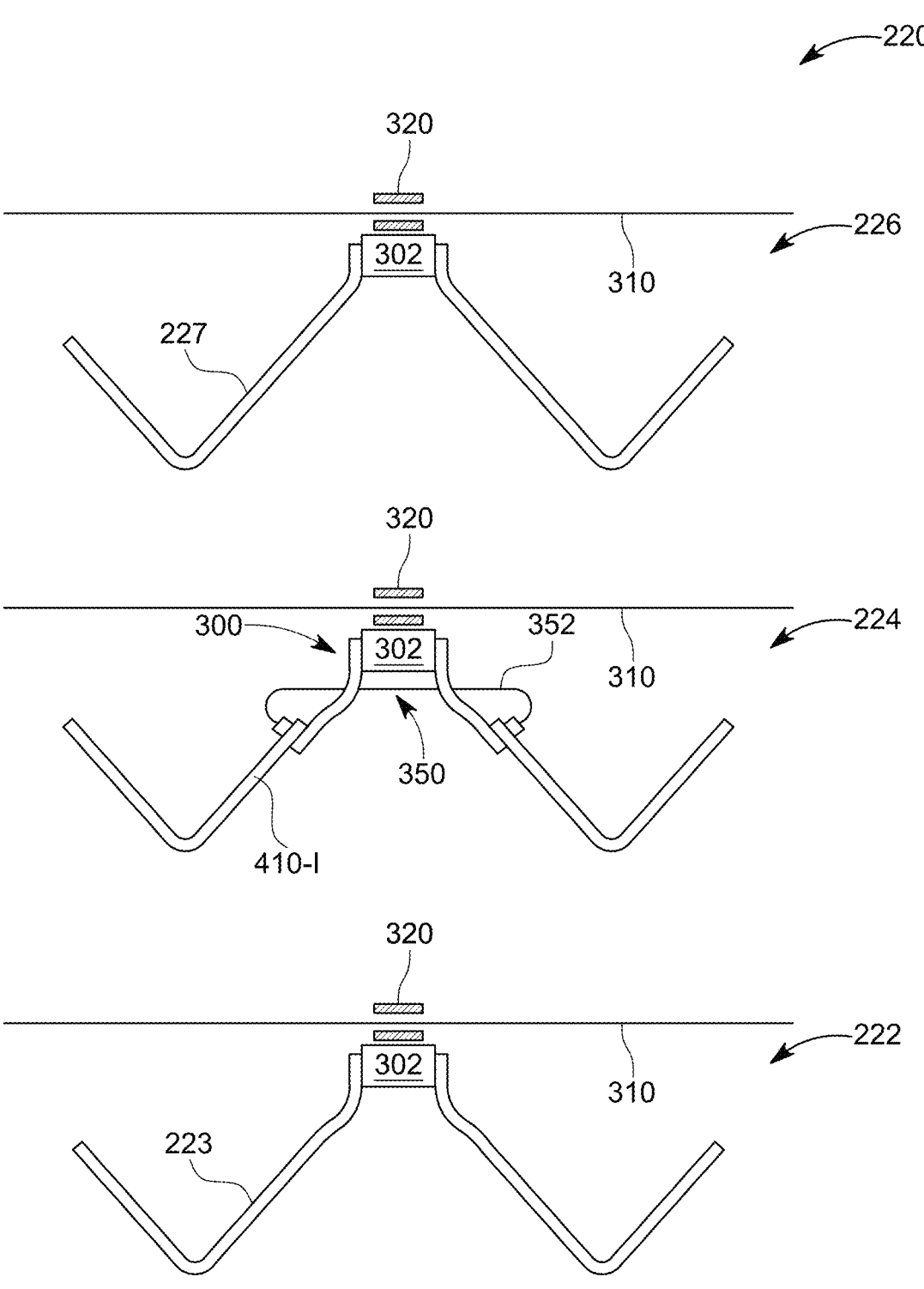
FIG. 8 is a side view of the multi-tier, foldable roof, having three different layers and a different connection mechanism.
Figure 9:
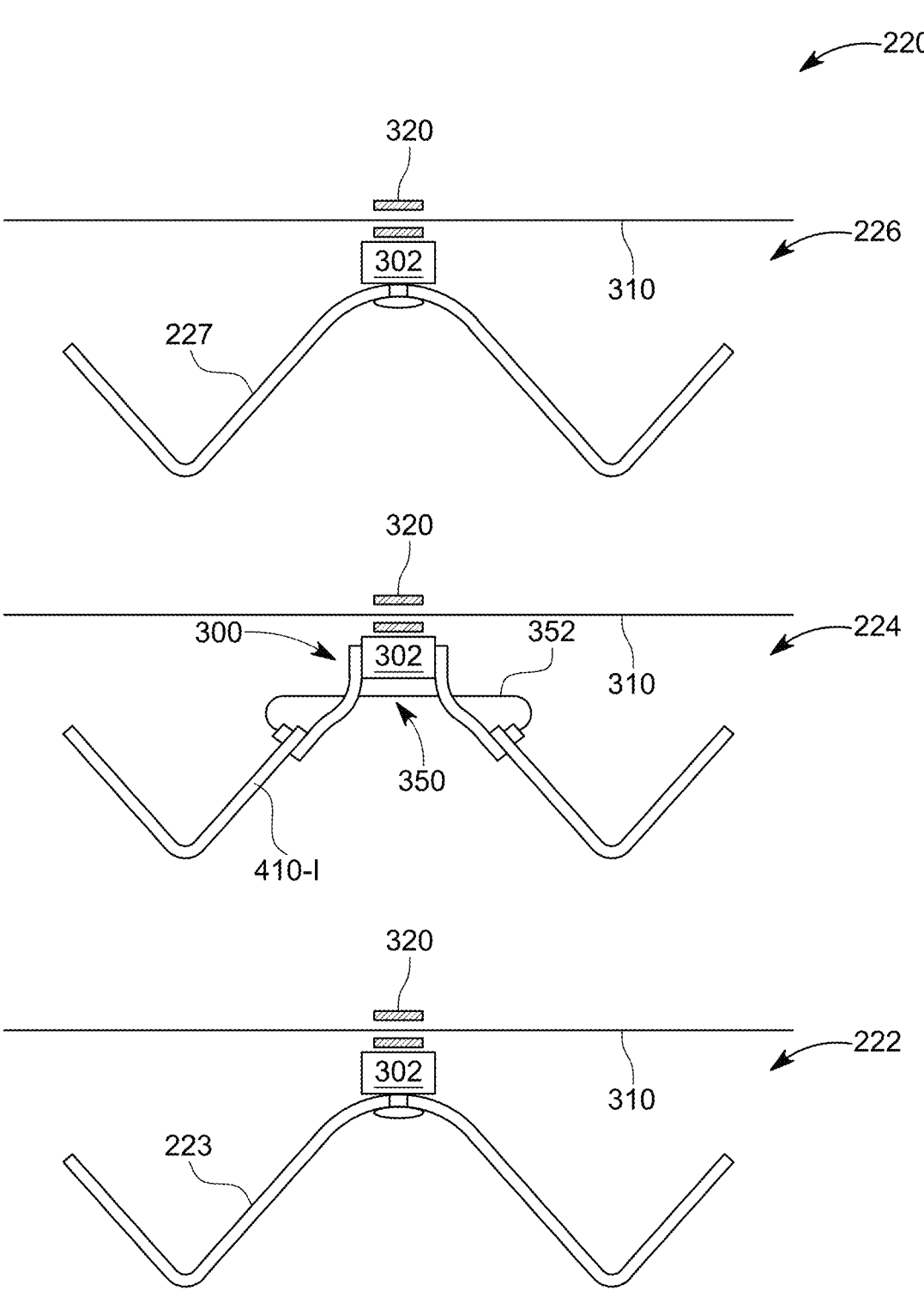
FIG. 9 is a side view of the multi-tier, foldable roof, having three different layers and yet another connection mechanism.

The connecting mechanism 300 illustrated in FIG. 3 may also be used for folding and unfolding the climate layer 222 and the outer layer 226. As illustrated in FIG. 7, the multi-tier foldable roof 220 includes a first connecting mechanism 300 for the outer layer 226, a second connecting mechanism 300 for the PV screen 224, and a third connecting mechanism 300 for the climate layer 222. While the second connecting mechanism 300 is the one shown in FIGS. 3 and 6, the first and third connecting mechanisms 300 do not include the electrical connection mechanism 350, as there is no need for transferring electrical power from one panel to another panel for the climate and outer layers as these layers do not include PV cells. Note that each of the outer layer 226 and the climate layer 222 are made of plural panels 227 and 223, respectively, but they do not include any PV cells. The plural panels 227 and 223 may be attached to fabric material 304, as shown in FIG. 3, or directly to the bracket 302, as illustrated in FIG. 8. In one application, all the panels 227 and 223 may be attached directly to each other, and an interface between the panels may be attached to the bottom of the bracket 302, as shown in FIG. 9. In yet another application, the fabric 304 comes in one long and wide piece that is expanded over a large area, and is attached to a wire bed as mentioned above and connected to a moving front bar. Variations of these attachments may be envisioned and implemented by those skilled in the art.

As opposed to existing foldable solar systems, the multi-tier foldable roof 220 is modular and the panels of each layer are dynamically adjustable. The term "dynamically adjustable" is used herein to mean that the panels of each layer can be opened and closed along the folds, in the direction of the axis perpendicular to the fold. In this regard, the term "dynamically adjustable" in this document means that the system can be opened and closed in a controlled way, either manually or automatically, by the controller 450.

Figure 10:
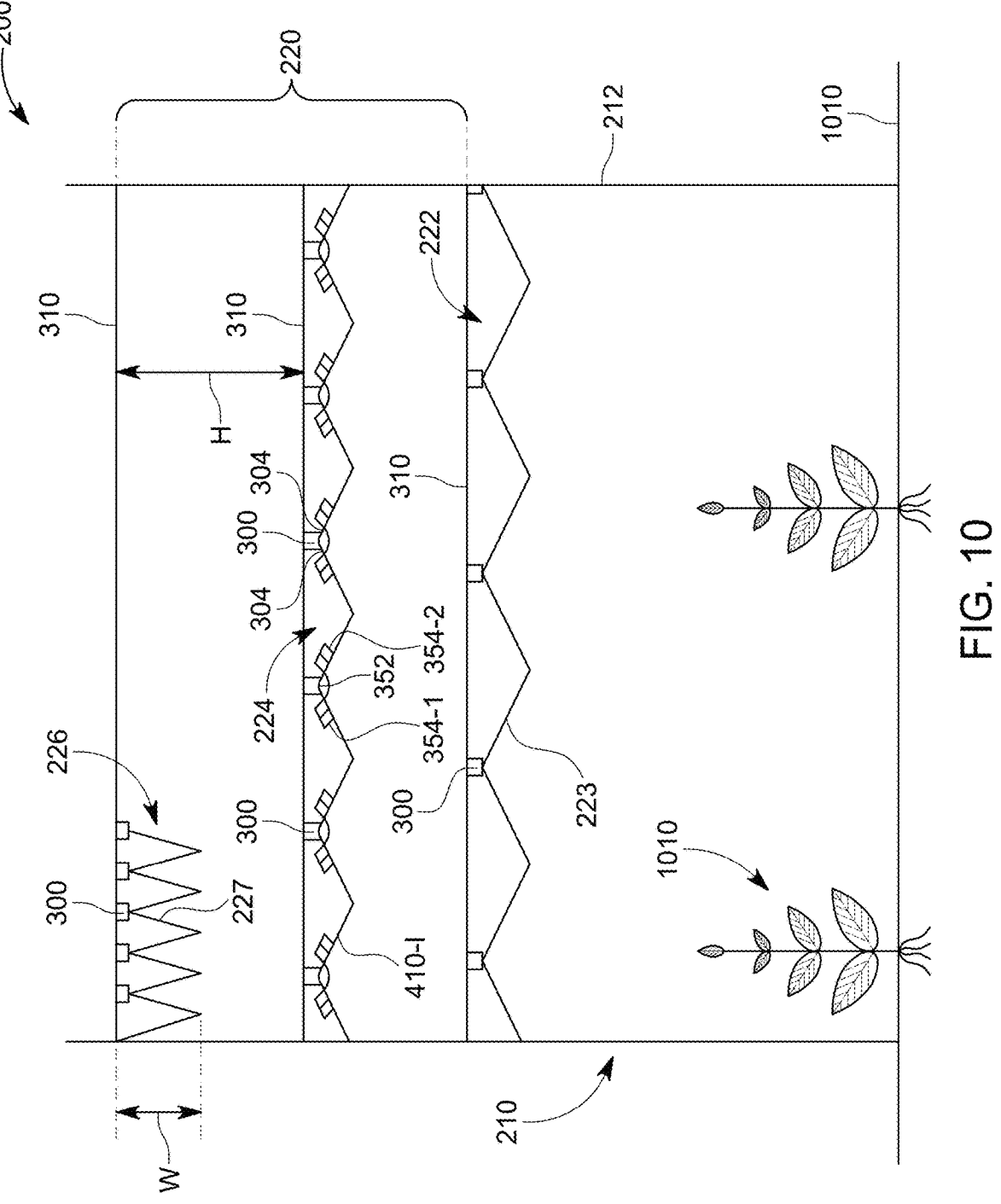
FIG. 10 is a side view of the structure provided with the multi-tier, foldable roof, having three independently operated different layers, and all the layers are fully expanded.

In this regard, FIG. 10 shows the three-tier foldable roof 220 attached to the structure 210, so that an opening defined by the walls 212 is closed. The figure shows the electrical cables 352 entering through the fabric layers 304 only for the PV screen 224, but not for the outer layer 226 and neither for the climate layer 222. FIG. 10 shows the outer layer 226 being retracted while the PV screen 224 and the climate layer 222 are expanded. Plants 1010 are shown placed inside the structure 210. Note that any combination of retracted and expanded layers may be possible, i.e., all three layers are expanded, all three layers are retracted, any two layers are retracted and the remaining layer is expanded, any two layers are expanded and the remaining layer is retracted. It is also possible that one or more of the layers are partially expanded while the other layers are fully expanded or fully retracted.

Also note that the hanging wires 310 for each of the layers 222 to 226 are distributed at different heights relative to the ground and they are vertically spaced so that when the layers are fully retracted, a width W of the panels from one layer do not interfere with the hanging wire from another layer. In other words, a separation distance H between two adjacent hanging wires 310 is larger than the width W of the panels. While FIG. 10 appears to suggest that all the panels of the various layers 222 to 226 have a same width W, it is possible that each layer has panels with different widths. In one application, the shading materials come in bulk, sitting on a plastic wire bed. This makes for a much simpler construct as one does not need interconnecting bars or profiles.

Thus, the climate layer 222, the PV screen 224 and the outer layer 226 are spaced apart from each other with a same or varying distance H, and each of the climate layer 222, the PV screen 224 and the outer layer 226 is configured to change from a fold state to an expanded state. In the fold state, the PV panels are substantially parallel to each other essentially perpendicular to the ground (see panels 227 in FIG. 10) while for the expanded state, the PV panels extend substantially in a single plane parallel to the ground (see panels 410-1 in FIG. 10).

As discussed above, the three layers 222 to 226 have different functionalities. Thus, in one embodiment, the outer layer 226, which may be made by UV-stabilized, high-transparency plastic film of superior quality is used to warrant the necessary environmental protection and replaces the glass panels used in a conventional greenhouse or similar structure. The outer layer 226 blocks UV radiation and forms a protective skin for the PV roof. The PV screen 224 is configured to act as a shading screen for optimal crop growth and also to efficiently transform the blocked sunlight into electricity. The electricity is fed into the electrical distribution panel of the greenhouse for efficient energy supply, forming the main source of power generation to support cooling, irrigation and climate control. The climate (or inner) layer 222 is configured to act as an energy saving screen; this screen ensures ideal climate control and minimize energy consumption. It is highly light transmissive and keeps the ambient under the screen at optimal temperatures and humidity for plant growth.

In one application, the PV screens can be cleaned with a special cleaning robot that slides on top of the screens, secured by a rail along which the robot can slide in x, y direction or similar.

Figure 1:
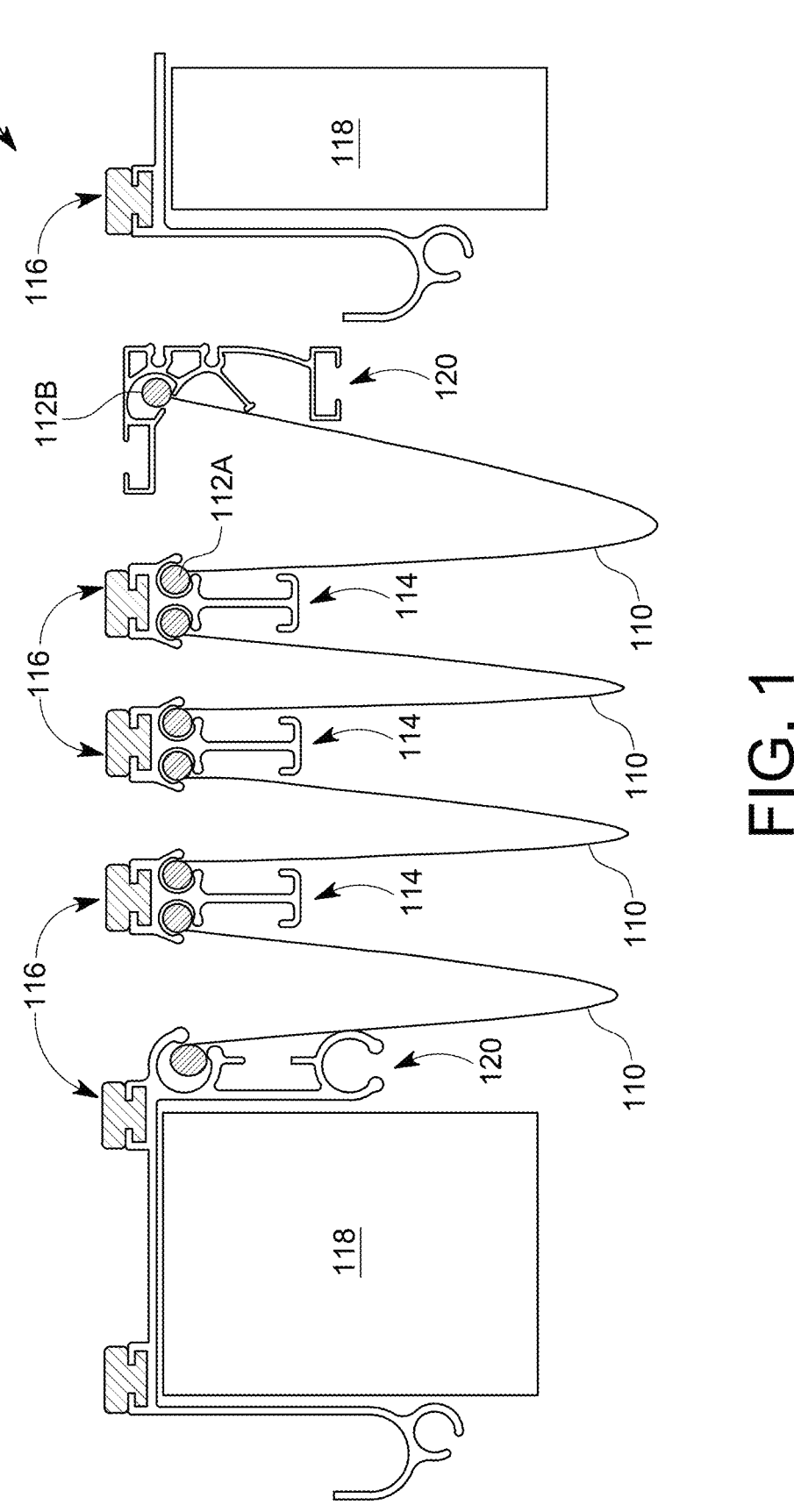
FIG. 1 illustrates a foldable roof for a building and the roof is configured to control an amount of light and air inflow.
Figure 11:
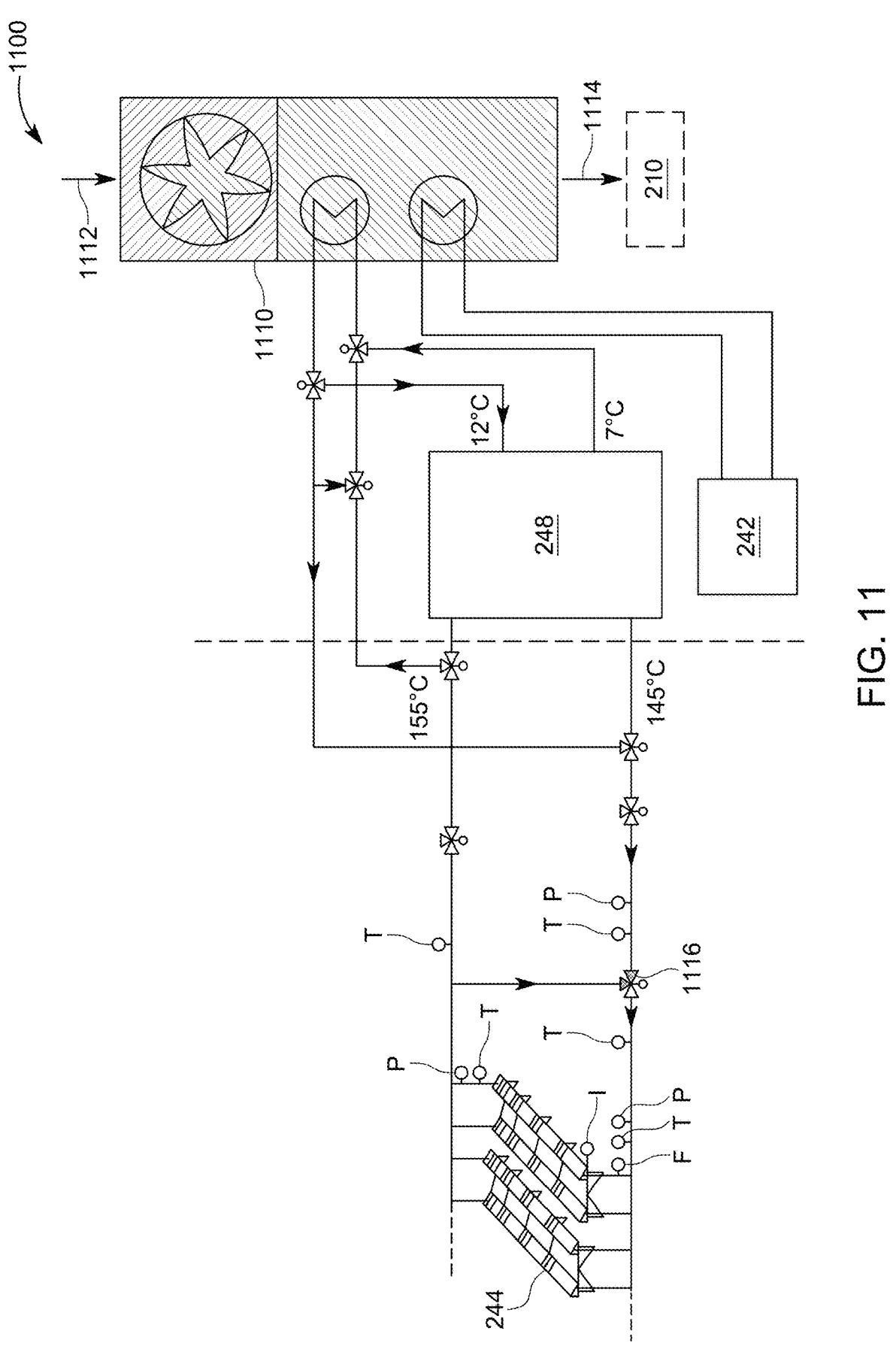
FIG. 11 schematically illustrates a solar cooling unit connected to the structure shown in FIGS. 2A and 2B.

In one embodiment, the greenhouse is designed to operate as an autonomous off-grid system during the day. The power generated by the PV screen 224 is relayed to a centralized DC/AC inverter and the AC power then connected to the electrical distribution panel (e.g., MDB: main distribution board 230 in FIG. 1). The PV energy is used to power irrigation, mist cooling, cooling fans, climate control and other auxiliary appliances inside the greenhouse. The solar collectors (motorized trackers) 244 and absorption (thermal) chiller 248 form together with the parabolic solar troughs 244, a solar cooling unit 1100, as illustrated in FIG. 11, which produces the necessary cold air to achieve a year-round controlled temperature environment of 25-26° C. near the plants. Air handling units 1110 are configured to cool an ambient air flow 1112, based on the solar cooling unit 1100, and produce a cooled air flow 1114, which is supplied to the greenhouse 210. The solar cooling unit 1100 is shown also having plural valves 1116, pressure sensors P, temperature sensors T, flow sensors F, and inclination sensors I. The inclination sensor I may be a camera, for determining the state of the three layers forming the roof, or individual accelerometers located on each of the three layers 222 to 226, for determining if each layer is retracted or not. In one application, the solar collectors 244 are covered with high transmission glass with a self-cleaning coating for protection against soiling.

The dimensions of the solar cooling unit, assuming a peak cooling demand of 600 TR (tons of refrigeration) and 5,365 MWh annual cooling demand, will require a solar collector field of about 2200 m², which will produce 2833 MWh cooling/year with a coefficient of performance of 1.52, corresponding to a solar fraction of 52%. The remaining cooling power may be delivered using a compression chiller powered by the excess PV power. The hot water heat battery 246 and a Lithium-ion battery pack 254 may be used to extend the cooling beyond daytime. Furthermore, grid electricity may be available at the MDB 230 as a backup for exceptional cooling demand beyond the power generated by the PV roof and the solar collectors.

When deployed over an area of about 1-ha, the system 200 might have a nameplate capacity of 1 MWp. In a scenario of having half the greenhouse area dedicated to growing crops that require a relative high Daily Light Integral (DLI) of ~27.5 μmol/m²/day (like tomatoes), and the other half dedicated to growing crops with a relatively low DLI of ~15 μmol/m²/day (typical for leafy greens), this system is expected to generate about 1500 MWh on an annual basis without negative impact on the crop yield. On the other hand, the power demand of the greenhouse is estimated to be about 1500-1700 MWh. Thus, a greenhouse with the retractable photovoltaic roof 220 paves the way for a new generation of sustainable greenhouses in hot climates regions.

Figure 12A:
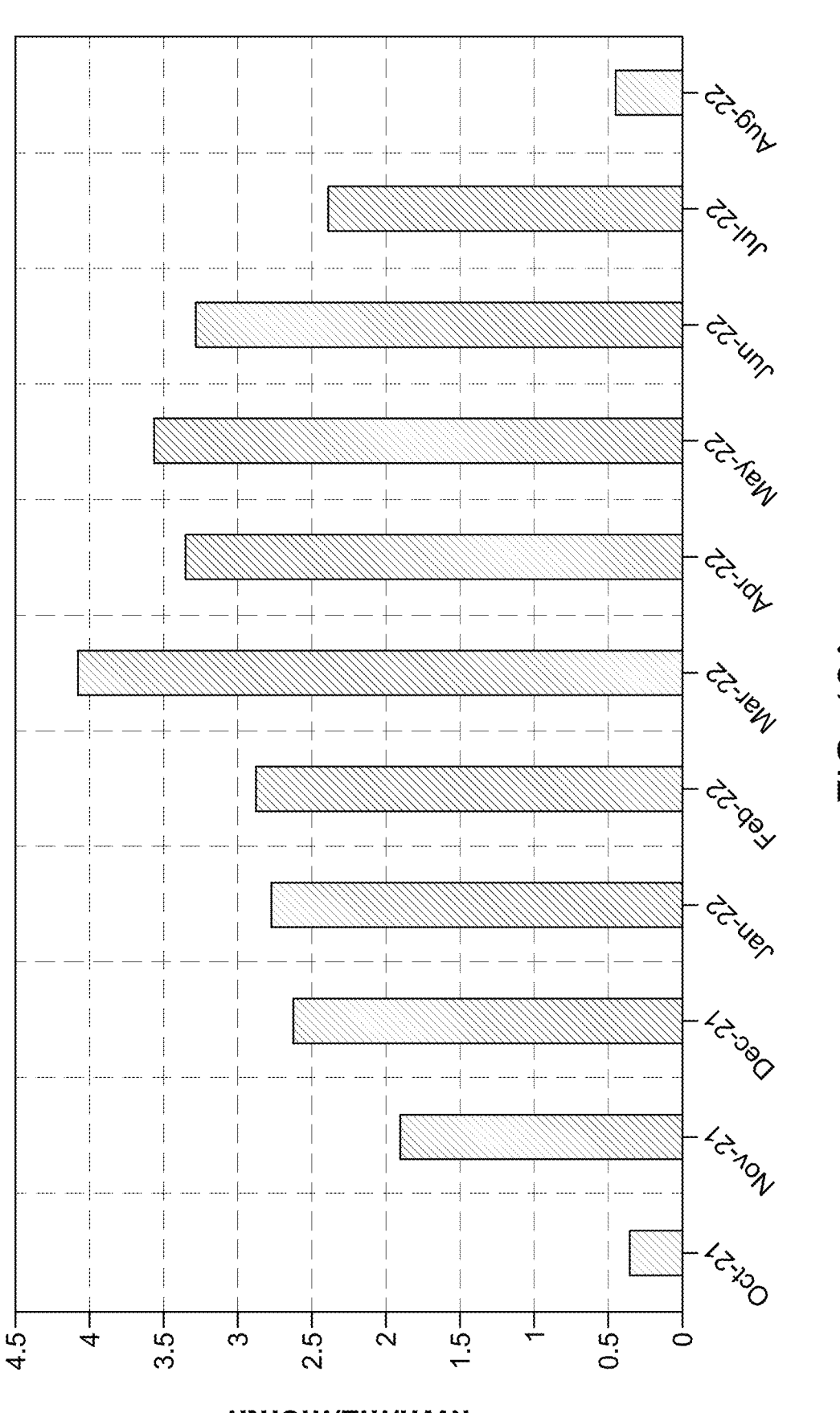
FIG. 12A shows a normalized energy yield of the system of FIGS. 2A and 2B, and FIG. 12B indicate the light losses due to limited light transmission through the system as each layer has an impact on the light transmission.
Figure 12B:
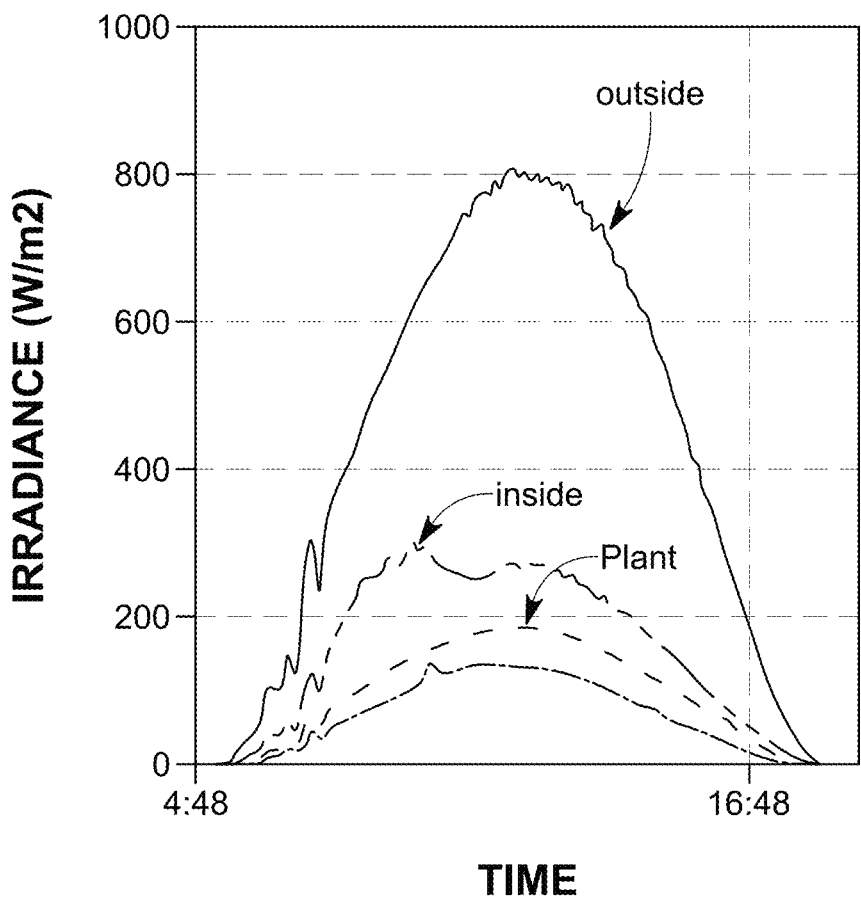

In this regard, FIG. 12A shows a normalized energy yield of the system 200. The system is installed indoors under the greenhouse roof to protect the crops near the plants. Thus, the performance is limited by the transmission of the roof. Light sensors installed outside the greenhouse, under the roof and near at plant level allow to estimate the losses due to limited light transmission, as shown in FIG. 12B. Using this information, the energy yield was extrapolated to the scenario discussed above, i.e., the 1-ha solar roof with very limited light.

The term "about" is used in this application to mean a variation of up to 20% of the parameter characterized by this term. It will be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

The disclosed embodiments provide a multi-tier folding PV roof that is retractable so that it can be adjusted between a fully retracted state and a fully open state to control not only an amount of electrical energy that is generated by the PV cells, but to also control an amount of solar light that passes through the PV system and/or a shadow generated by the PV roof. The electricity and light/shadow can be used to power and/or control peripheral instrumentation or processes or simply shadowing. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A multi-tier, foldable roof including photovoltaic (PV) cells for transforming solar energy into electrical energy, the roof comprising:
   a climate layer configured to close an opening of a structure and also configured to control temperature and humidity of an interior of the structure;
   a PV screen having plural PV panels, each PV panel configured to include plural PV cells; and
   an outer layer configured to protect the PV screen from soiling,
   wherein the climate layer, the PV screen and the outer layer are spaced apart from each other with a given distance (H), and
   wherein each of the climate layer, the PV screen and the outer layer is configured to independently change from a retracted state to an expanded state.

2. The roof of claim 1, further comprising:
   plural connecting mechanisms configured to suspend each of the climate layer, the PV screen and the outer layer from a corresponding hanging wire.

3. The roof of claim 2, further comprising:
   an electrical connection mechanism configured to electrically connect a first PV panel of the PV screen to a second PV panel of the PV screen.

4. The roof of claim 3, wherein the electrical connection mechanism includes an electrical cable having first and second end pads, the first pad being configured to electrically connect to the first PV panel and the second pad being configured to electrically connect to the second PV panel.

5. The roof of claim 4, wherein a connecting mechanism, of the plural connecting mechanisms, that mechanically connects the first PV panel to the second PV panel includes a bracket, and first and second fabric layers, the first fabric layer connects with a first end to the bracket and with a second end to the first PV panel, and the second fabric layer connects with a first end to the bracket and with a second end to the second PV panel.

6. The roof of claim 5, wherein the electrical cable extends from the first PV panel to the second PV panel through holes made in the first and second fabric layers.

7. The roof of claim 2, wherein a connecting mechanism, of the plural connecting mechanisms, that mechanically connects the first PV panel to the second PV panel includes a bracket, and first and second fabric layers, the first fabric layer connects with a first end to the bracket and with a second end to the first PV panel, and the second fabric layer connects with a first end to the bracket and with a second end to the second PV panel.

8. The roof of claim 1, wherein in the retracted state, the PV panels are substantially parallel to each other and in the expanded state, the PV panels extend substantially in a single plane.

9. The roof of claim 1, wherein the PV screen is located between the outer layer and the climate layer.

10. The roof of claim 1, wherein the PV screen is partially transparent to light with a transparency that can be tuned while the outer and climate layers are fully transparent to light.

11. A photovoltaic, PV, screen to be used to cover a greenhouse, the PV screen comprising:
   a first PV panel including plural PV cells configured to transform solar energy into electrical energy;
   a second PV panel including plural PV cells configured to transform solar energy into electrical energy;
   a connecting mechanism configured to suspend each of the first and second PV panels from a hanging wire, the connecting mechanism including a bracket and first and second fabric layers, the first fabric layer connecting the first PV panel to the bracket and the second fabric layer connecting the second PV panel to the bracket; and an electrical connection mechanism configured to electrically connect the first PV panel to the second PV panel, wherein the electrical connection mechanism includes an electrical cable that extends through each of the first and second fabric layers.

12. The PV screen of claim 11, wherein the connecting mechanism comprises:

a clip configured to directly connect to the hanging wire;

the bracket configured to fixedly receive first ends of the first and second fabric layers; and the first and second fabric layers.

13. The PV screen of claim 12, wherein second ends of the first and second fabric layers are configured to fixedly attach to the first and second PV panels, respectively.

14. The PV screen of claim 11, wherein the electrical connection mechanism comprises:

the electrical cable; and first and second electrical connectors attached to first and second ends of the electrical cable, wherein the first electrical connector is configured to attach to a first junction box of the first PV panel and the second electrical connector is configured to attach to a second junction box of the second PV panel.

15. The PV screen of claim 14, wherein the electrical cable extends through holes made in the first and second fabric layers.

16. The PV screen of claim 11, wherein each of the first and second PV panels is integrally connected to an additional PV panel, at a given interface, and each of the first and second PV panels and the corresponding additional PV panels fold at the given interface so that the PV screen is in a retracted state.

17. A structure with a multi-tier foldable roof, the structure comprising:

plural walls that define an enclosure; and the multi-tier foldable roof that covers the enclosure, wherein the multi-tier foldable roof comprises:

a climate layer configured to close the enclosure and also configured to control temperature and humidity of the enclosure;

a PV screen having plural PV panels, each PV panel configured to include plural PV cells; and an outer layer configured to protect the PV screen from soiling, wherein the climate layer, the PV screen and the outer layer are spaced apart from each other with a given distance (H), and wherein each of the climate layer, the PV screen and the outer layer is configured to independently change from a retracted state to an expanded state.

18. The structure of claim 17, further comprising:

plural connecting mechanisms configured to suspend each of the climate layer, the PV screen and the outer layer from a corresponding hanging wire; and an electrical connection mechanism configured to electrically connect a first PV panel of the PV screen to a second PV panel of the PV screen.

* * * * *